United States Patent
Baeuerle et al.

(10) Patent No.: US 6,928,360 B2
(45) Date of Patent: Aug. 9, 2005

(54) METHOD AND ARRANGEMENT FOR MONITORING AN AIR-MASS MEASURING DEVICE

(75) Inventors: Michael Baeuerle, Ditzingen-Heimerdingen (DE); Carsten Reisinger, Stuttgart (DE); Guido Porten, Enzweihingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/620,564

(22) Filed: Jul. 17, 2003

(65) Prior Publication Data

US 2004/0019424 A1 Jan. 29, 2004

(30) Foreign Application Priority Data

Jul. 17, 2002 (DE) .......................................... 102 32 337

(51) Int. Cl.⁷ ................................................. B60T 7/12
(52) U.S. Cl. ...................... 701/102; 701/103; 701/109; 701/110; 73/118.1
(58) Field of Search ................................ 73/1.16, 118.1; 701/102, 103, 109, 110; 60/274, 280, 284

(56) References Cited

U.S. PATENT DOCUMENTS 5,771,476 A * 6/1998 Mufford et al. ................ 701/22
6,041,593 A * 3/2000 Karlsson et al. .............. 60/284

* cited by examiner

*Primary Examiner*—Tony M. Argenbright
*Assistant Examiner*—Johnny H. Hoang
(74) *Attorney, Agent, or Firm*—Walter Ottesen

(57) ABSTRACT

An arrangement for monitoring an air-mass measuring device (1) includes an electrically driven compressor (10) in an air supply of an internal combustion engine (5). The arrangement makes possible a precise modeling of the air mass flow. An air mass flow in the air supply is modeled in dependence upon a compressor rpm and a compressor pressure ratio and is compared to an air mass flow measured by the air-mass measuring device (1). The invention is also directed to a method for monitoring the air-mass measuring device (1).

13 Claims, 2 Drawing Sheets

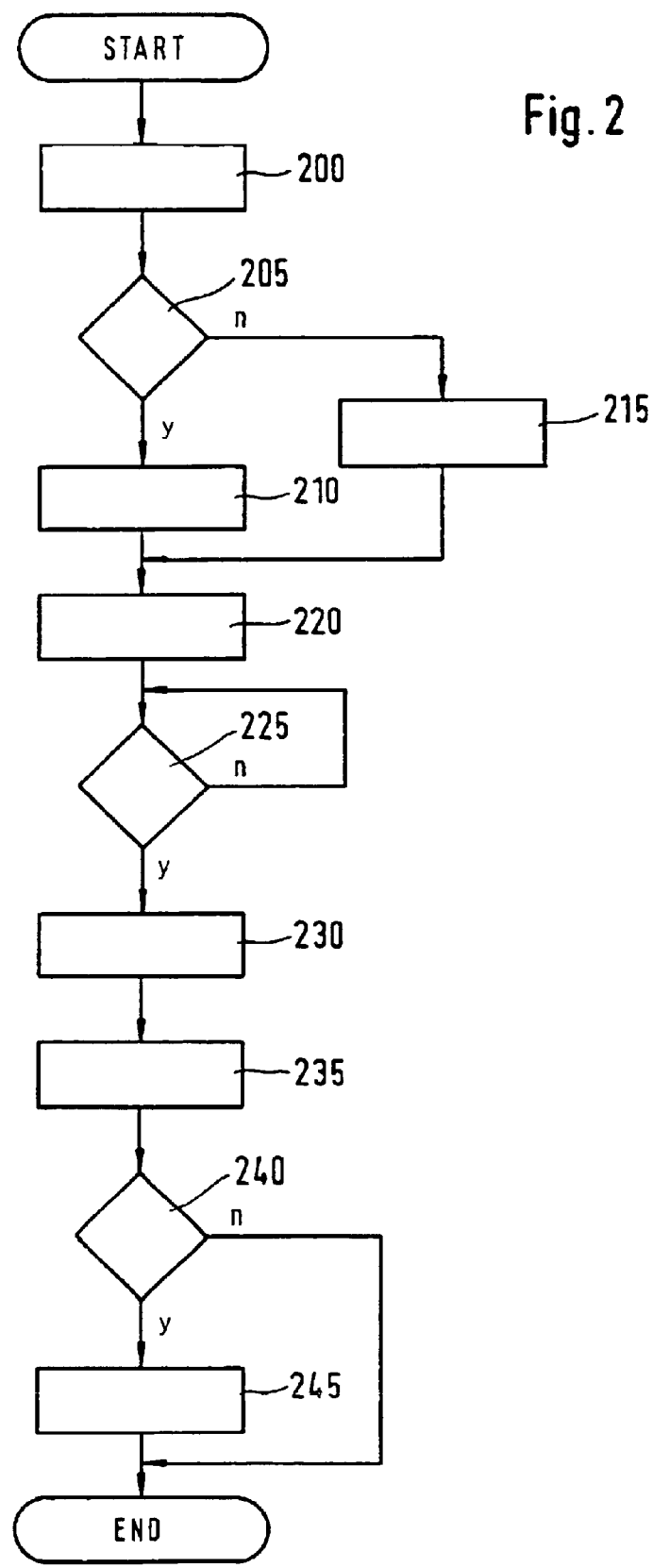

METHOD AND ARRANGEMENT FOR MONITORING AN AIR-MASS MEASURING DEVICE

BACKGROUND OF THE INVENTION

In many internal combustion engines, a hot-film air-mass sensor is used to measure the air mass flow flowing into an internal combustion engine. The diagnosis of the hot-film air-mass sensor takes place via a plausibility check of the air mass flow, which is measured by the hot-film air-mass sensor, via a comparison to an air mass flow modeled in dependence upon a throttle flap angle and the engine rpm. The requirements as to the plausibility check increase when an electrically-operated compressor is built into the air supply, that is, into the intake system of the engine.

SUMMARY OF THE INVENTION

Compared to the above, the method and arrangement of the invention afford the advantage that an air mass flow is modeled in the air supply in dependence upon the compressor rpm and a compressor pressure ratio and is compared to an air mass flow measured by the air-mass measuring device. In this way, the operation of the electrically-operated compressor in the air supply of the engine is considered in the monitoring of the air-mass measuring device so that the above-mentioned plausibility check can be carried out especially reliably.

The electrically-driven compressor is built into the air supply of the engine and this compressor affords the advantage of generating an air mass flow independently of the operation of the engine. A modeling of the air mass flow which adjusts is possible with a compressor characteristic field, a compressor rpm and a compressor pressure ratio. This air mass flow can be compared to the air mass flow measured by the air-mass measuring device. In this way, a possibility is afforded for monitoring the air-mass measuring device after switching off the internal combustion engine in a so-called control apparatus after-run.

The method of the invention is for monitoring an air-mass measuring device in an air supply system of an internal combustion engine having an electrically-driven compressor. The method includes the steps of: modeling an air mass flow in the air supply system in dependence upon an rpm of the compressor and a pressure ratio of the compressor to obtain a modeled air mass flow; and, comparing the modeled air mass flow to a measured air mass flow measured by the air-mass measuring device.

It is especially advantageous when the measurement of the compressor compression ratio is carried out when a bypass to at least one cylinder (especially, an exhaust-gas recirculation valve) is opened. In this way, an excessive pressure buildup behind the electrically-operated compressor can be avoided and a constant, uniform and homogeneous air mass flow can be generated by the electrically-driven compressor. This increases the reliability of the monitoring of the air-mass measuring device.

A further advantage is that the measurement of the compressor pressure ratio is carried out when a throttle flap is opened. In this way too, an excessive pressure buildup behind the electrically-driven compressor can be avoided and a constant, uniform and homogeneous air mass flow can be generated.

A further advantage is that the measurement of the compressor pressure ratio is carried out when an inlet valve and an outlet valve of at least one cylinder are open simultaneously. In this way, an excessive pressure buildup behind the electrically-operated compressor can be avoided and a constant, uniform and homogeneous air mass flow can adjust.

A further advantage is that the two valves are opened in dependence upon a piston position in at least one cylinder to measure the compressor pressure ratio. In this way, mechanical damage of the piston by an opening of the valves can be avoided.

A further advantage is that for the measurement of the compressor pressure ratio, a valve overlapment of an inlet valve and an outlet valve of at least one cylinder is used in dependence upon a run-out position of the piston. In this way, an excessive pressure buildup behind the electrically-operated compressor is avoided and a constant, uniform and homogeneous air mass flow is adjusted.

A further advantage is that, in advance of activating the electrically-driven compressor, a pressure sensor for determining the pressure in the air supply downstream of the electrically-operated compressor is matched with an ambient pressure sensor. In this way, the accuracy when measuring the compressor pressure ratio is increased.

A further advantage is that the air-mass measuring device is matched to the modeled air mass flow (especially outside of a pregiven tolerance range) in dependence upon the comparison between the modeled air mass flow and the measured air mass flow. In this way, a calibration with high accuracy is realized for the air-mass measuring device. This is especially the case when the accuracy of the air-mass measuring device had been previously greatly reduced because of a dirtying or contamination of its sensor element.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
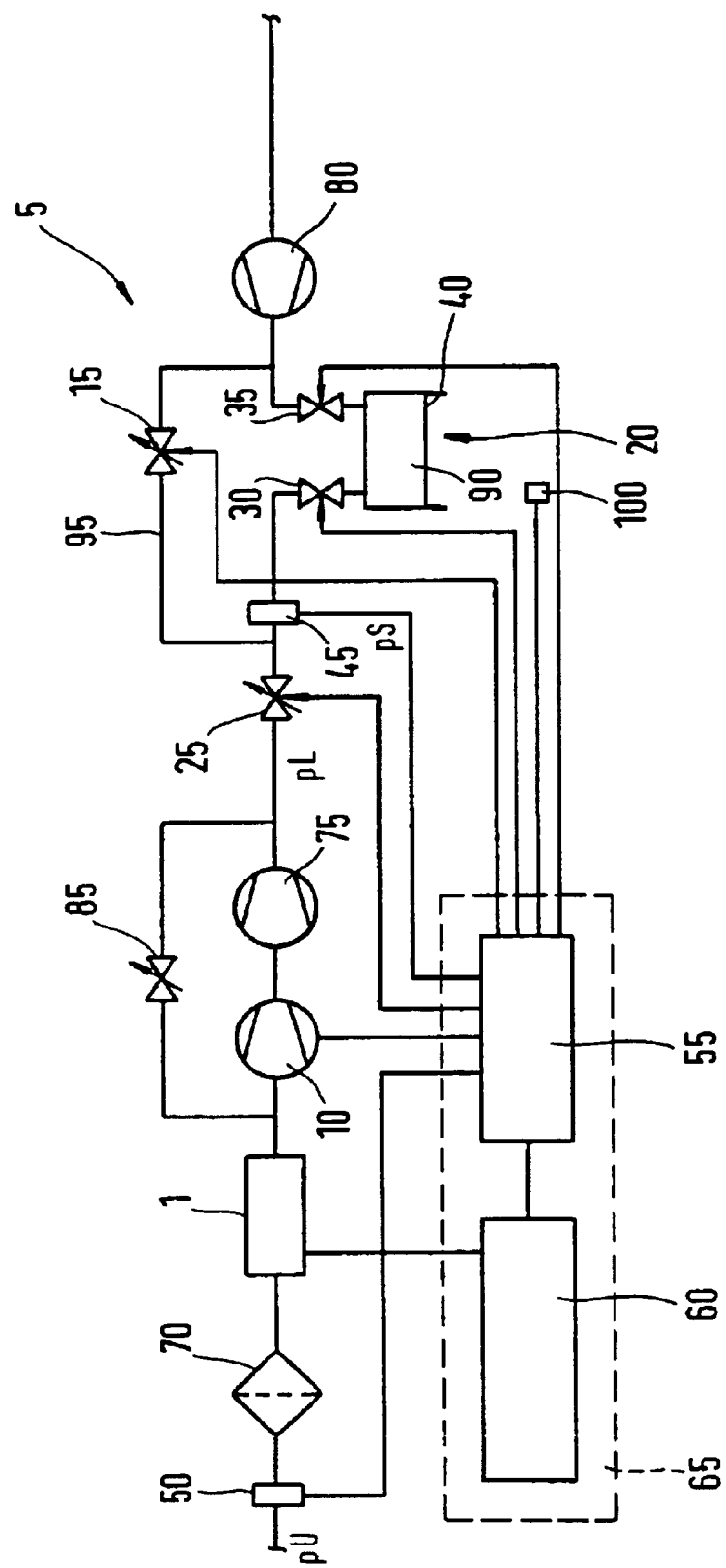
FIG. 1 is a block diagram of an internal combustion engine with the arrangement according to the invention; and, FIG. 2 is a flowchart for explaining the method of the invention.

In FIG. 1, reference numeral 5 identifies an internal combustion engine such as an engine of a motor vehicle. The engine has an air supply and a second pressure sensor 50 is included therein which measures the pressure in the air supply ahead of an electrically-driven compressor 10. In the following, it is assumed by way of example that the pressure ahead of the electrically-driven compressor 10 is an ambient pressure pU and the second pressure sensor 50 is an ambient pressure sensor. An air filter 70 and an air-mass measuring device 1 are mounted between the ambient pressure sensor 50 and the electrically-driven compressor 10. The air-mass measuring device 1 can, for example, be a hot-film air-mass sensor. In this example, a compressor 75 of an exhaust-gas turbocharger is mounted downstream of the electrically-driven compressor 10. The exhaust-gas turbocharger is not absolutely necessary with respect to the operation of the invention. However, in this embodiment, it is assumed that the compressor 75 of the exhaust-gas turbocharger is connected in the air supply of the engine 5 downstream of the electrically-driven compressor 10. The electrically-driven compressor 10 can be an electric auxiliary compressor self contained with respect to the compressor 75 of the exhaust-gas turbocharger. Alternatively, the electrically-driven compressor 10 can also be part of the exhaust-gas turbocharger and can directly drive the shaft between a turbine 80 of the exhaust-gas turbocharger and the compressor 75 of the exhaust-gas turbocharger.

The intake end of the electrically-driven compressor 10 and the pressure end of the compressor 75 of the exhaust-gas turbocharger can be connected via a thrust recirculation valve 85 as shown in FIG. 1 in order to avoid an unwanted compressor pumping. A charging pressure pL is present in the air supply of the engine 5 forward of the two compressors (10, 75). A throttle flap 25 is mounted downstream in the air supply and this throttle flap is followed by a pressure sensor 45. The first pressure sensor 45 determines the pressure in the intake manifold downstream of the throttle flap 25, that is, the intake manifold pressure pS. Thereafter, an inlet valve 30 of a cylinder 20 follows. The cylinder 20 has a piston 40 and a combustion chamber 90. The combustion chamber 90 can be connected via an outlet valve 35 to the exhaust-gas system wherein the turbine 80 of the exhaust-gas turbocharger is mounted. Further, a bypass 15 is provided and is, for example, an exhaust-gas recirculation valve which controls an air path parallel to the following: inlet valve 30, cylinder 20 and outlet valve 35. According to FIG. 1, this air path is identified by reference numeral 95 and, on the one hand, branches out from the exhaust-gas system between the outlet valve 35 and the turbine 80 of the exhaust-gas turbocharger and, on the other hand, branches out between the throttle flap 25 and the first pressure sensor 45 in the air supply.

Furthermore, a device 65 is provided which, for example, can be part of the engine control of the internal combustion engine 5. The device 65 includes means 55 for modeling an air mass flow. The means 55 is connected to the following: the compressor 10 of the electrically-driven charger; the throttle flap 25; the first pressure sensor 45; the second pressure sensor 50; the exhaust-gas recirculation valve 15; the inlet valve 30; and, the outlet valve 35. Furthermore, the device 65 includes means 60 for comparing the modeled air mass flow to an air mass flow measured by the air-mass measuring device 1. The means 60 is connected to the means 55 and to the air-mass measuring device 1.

In the following, the operation of the device 65 according to the invention will be described.

The monitoring of the air-mass measuring device 1 can be carried out during operation of the engine 5 or after the engine is switched off. During operation of the engine 5, a consideration of the influence of the operating state of the engine 5 on the modeling of the air mass flow in the air supply of the engine is required for the monitoring of the air-mass measuring device 1. A comparatively less complex monitoring of the air-mass measuring device 1 can be carried out after switchoff of the engine 5 and is described hereinafter by way of example.

After the engine 5 is switched off, the monitoring of the air-mass measuring device 1 takes place in a so-called control apparatus after-run. First, the means 55 can match the first pressure sensor 45 to the second pressure sensor 50. This is therefore possible and purposeful because, after switching off the engine 5, approximately ambient pressure is present downstream of the compressors (10, 75), that is, downstream of the throttle flap 25. Furthermore, the accuracy of the second pressure sensor 50 is greater than the accuracy of the first pressure sensor 45 because of its smaller measuring range. The second pressure sensor 50 is, in this example, configured as an ambient pressure sensor and the first pressure sensor 45 is an intake manifold pressure sensor. Accordingly, after matching the intake manifold pressure sensor 45 to the ambient pressure sensor 50, the ambient pressure pU and the intake manifold pressure pS are available in the means 55 with approximately the same accuracy. In lieu of the intake manifold sensor 45 which is downstream of the throttle flap 25, a charging pressure sensor for measuring the charging pressure can be provided between the two compressors (10, 75) on the one side and the throttle flap 25 on the other side and, in a corresponding manner, this charging pressure sensor can be matched to the ambient pressure sensor 50. The charging pressure between the two compressors (10, 75), on the one hand, and the throttle flap 25, on the other hand, is identified in FIG. 1 by pL. After the described matching, the diagnosis or monitoring of the air-mass measuring device 1 can begin. In order to make possible a continuous air mass flow of relevant size in the air supply, an excessive pressure buildup behind the compressors (10, 75) must be avoided. This can take place in various ways. In internal combustion engines having exhaust-gas recirculation as shown in FIG. 1, the means 55 control the exhaust-gas recirculation valve 15 in such a manner that it is opened and therefore defines the necessary connection between the air supply and the exhaust-gas system and therefore the ambient. Air mass flows up to the region of 150 kg/h at a pressure difference of 200 mbar are possible between the air supply behind the two compressors (10, 75) and the exhaust-gas system. With the opening of the exhaust-gas recirculation valve 15, an excessive pressure buildup can be avoided behind the two compressors (10, 75) and especially behind the electric compressor 10 and a constant, uniform and homogeneous air mass flow adjusts in the air supply. In systems having an electric throttle flap 25 as shown in FIG. 1, the throttle flap can additionally be driven by means 55 in such a manner that the throttle flap opens in order to avoid flow losses. This measure too functions to avoid an excessive pressure buildup behind the electric compressor 10 and to adjust a constant, uniform and homogeneous air mass flow.

The opening of the exhaust-gas recirculation valve 15 is especially required when an air flow via the cylinder 20 is not possible or only possible to a limited extent because the inlet valve 30 and/or the outlet valve 35 block. In internal combustion engines 5 having a correspondingly large valve overlapment of the inlet valve 30 and the outlet valve 35, the fact can, however, be used that a sensor for determining the run-out position of the cylinder 20 is provided for a rapid start of the engine 5. A sensor of this kind is shown in FIG. 1 and is identified by reference numeral 100 and can be connected to the means 55. The monitoring of the air-mass measuring device 1 can be triggered by the means 55 when the sensor 100 detects a run-out position of the cylinder 20 wherein the piston 40 comes to standstill for the charge exchange in the region of top dead center whereat the inlet valve 30 and the outlet valve 35 are simultaneously open because of the valve overlapment. This makes possible an air mass flow via the open inlet valve 30 and the combustion chamber 90 of the cylinder 20 to the open outlet valve 35, for example, up to approximately 50 kg/h. If, in contrast, the piston 40 comes to standstill at a crankshaft angle at which the inlet valve 30 and the outlet valve 35 are not open simultaneously, the means 55 triggers the monitoring of the air-mass measuring device 1 not because of the run-out position of the cylinder 20 because, in this case, no air mass flow can be conducted via the inlet valve 30, the combustion chamber 90 and the outlet valve 35. In this case, the opening of the exhaust-gas recirculation valve 15 is absolutely necessary. The opening of the exhaust-gas recirculation valve 15 by the means 55 can, however, also be provided in addition to a possible air mass flow with simultaneously opened inlet valve 30 and outlet valve 35 via the cylinder 20 in order to be able to adjust the air mass flow from the air supply to the exhaust-gas system in a more differentiated way and therefore more uniformly.

When a system is built with a variable valve control (for example, an electromechanical valve control), the inlet valve 30 and the outlet valve 35 can be driven independently of the position of the piston 40 by the means 55 in such a manner that the valves are open simultaneously in order to prevent an excessive pressure buildup by the electric compressor 10 and to generate a constant, uniform and homogeneous air mass flow. The position of the piston 40 should at least be considered so that the piston is not in a position wherein an opening of the inlet valve 30 and of the outlet valve 35 could lead to a mechanical collision of these valves (30, 35) with the piston 40, for example, at an upper ignition dead center point of the piston 40. In this case, a driving of the inlet valve 30 and of the outlet valve 35 for simultaneous opening should be avoided and the excessive pressure buildup by a corresponding drive of the exhaust-gas recirculation valve 15 should be avoided. In addition to the variable or fully variable valve control of the inlet valve 30 and of the outlet valve 35, the drive of the exhaust-gas recirculation valve 15 for opening the bypass to the cylinder 20 can take place in the sense of a simultaneous opening of these two valves (30, 35) at a suitable position of the piston 40 in order to avoid the pressure buildup behind the electric compressor 10 in a more differentiated way and therefore to make the air mass flow still more uniform.

Accordingly, when one or several of the above-mentioned measures have been triggered by the means 55 to avoid an excessive pressure buildup and to establish a constant, uniform and homogeneous air mass flow, the electric compressor 10 is driven by the means 55 and controlled to a favorable rpm. As soon as a constant pressure behind the electric compressor 10 is adjusted and measured with the first pressure sensor 45, the air mass flow, which adjusts, is modeled as explained below.

A compressor characteristic field is stored in the means 55 for the operation of the internal combustion engine S. The compressor characteristic field defines a relationship between the rpm of the electric compressor 10, the compressor pressure ratio across the electric compressor 10 and the air mass flow which is generated thereby. For this monitoring, it is assumed that the exhaust-gas turbocharger is out of service or a wastegate of the exhaust-gas turbocharger is completely open. Because of the rpm control, the rpm of the electric compressor 10 is known in the means 55. The rpm of the electric compressor 10 can be detected by an rpm sensor and be supplied to the means 55 and is thereby available with high accuracy. The pressure ahead of the electric compressor 10 (that is, the ambient pressure pU) and the pressure downstream of the electric compressor 10 (that is, the intake manifold pressure pS in this example) are known in the means 55 from the measured values of the first pressure sensor 45 and of the second pressure sensor 50. Alternatively, and as described, the charging pressure pL can be used for the pressure downstream of the electric compressor 10 and is detected by a suitable pressure sensor. The ratio of the pressure downstream of the electric compressor 10 to the pressure upstream of the electric compressor 10 (that is, in this example, the ratio of the intake manifold pressure pS to the ambient pressure pU) defines the compressor pressure ratio. This is determined in the means 55 from the intake manifold pressure pS and the ambient pressure pU. From the compressor pressure ratio determined in this manner and the rpm of the electric compressor 10, which is known because of the rpm control, the means 55 can now model the air mass flow based on the compressor characteristic field. This air mass flow is generated by the electric compressor 10 and adjusts. The modeled air mass flow is supplied to the means 60 by the means 55. Furthermore, the air mass flow, which is measured by the air mass flow measuring device 1, is supplied to the means 60. The means 60 compares the modeled air mass flow to the measured air mass flow.

When the means 60 determines from a comparison of the modeled air mass flow with the measured air mass flow that a difference between the modeled air mass flow and the measured air mass flow exceeds a pregiven value in magnitude, then the means 60 detects a fault and outputs, for example, a corresponding warning announcement or fault announcement.

Furthermore, a calibration of the air-mass measuring device 1 can be realized with a corresponding high accuracy of the modeling of the air mass flow from the compressor characteristic field. This is especially so when the accuracy of the air-mass measuring device 1 is greatly reduced because of contamination of a sensor element provided for measuring the air mass flow in the air-mass measuring device 1 as can be the case, for example, with diesel engines. The procedure in such a calibration of the air-mass measuring device 1 takes place in the manner described for the monitoring except that in lieu of a single rpm of the electric compressor 10 different rpms of the electric compressor 10 are adjusted sequentially and the air-mass measuring device 1 is matched to the modeled air mass flow for each rpm.

The calibration or the matching of the air-mass measuring device 1 to the modeled air mass flow can be carried out in an advantageous manner, for example, only in the case wherein the difference between the modeled air mass flow and the air mass flow, which is measured by the air-mass measuring device 1, exceeds in magnitude the pregiven value which, in this manner, defines a tolerance range.

In FIG. 2, the method of the invention is explained again by way of example with reference to a flowchart.

The program is started after the switchoff of the internal combustion engine 5 in the so-called control apparatus after-run. At program point 200, the means 55 execute the matching of the first pressure sensor 45 to the ambient pressure sensor 50 in the manner described. Thereafter, the program branches to program point 205.

At program point 205, the means 55 checks whether a run-out position of the cylinder 20 is present whereat the inlet valve 30 and the outlet valve 35 are open simultaneously or, for a variable or fully variable valve control, whether the piston 40 is present in a position wherein an opening of the inlet valve 30 and of the outlet valve 35 does not lead to a mechanical collision with the piston 40. If one of the two conditions is satisfied, the program branches to program point 210 and, if none of the two conditions is satisfied, the program branches to program point 215.

A program point 210, the means 55 cause triggering of the monitoring of the air-mass measuring device 1 for the case that the sensor 100 has detected a favorable run-out position of the cylinder 20 whereat the inlet valve 30 and the outlet valve 35 are open simultaneously. For the case of variable or fully variable valve control (especially electromechanical valve control), the means 55 trigger a drive of the inlet valve 30 and of the outlet valve 35 at program point 210 in such a manner that the inlet valve 30 and the outlet valve 35 are opened simultaneously in order to prevent an excessive pressure buildup by the subsequently activated electric compressor 10 and to generate a constant, uniform and homogeneous air mass flow. The position of the piston 40 can be detected likewise with the sensor 100 for checking at program point 205 as to whether a simultaneous opening of the inlet valve 30 and of the outlet valve 35 is possible for the variable or fully variable valve control.

After program point 210, there is a branching of the program to program point 220. At program point 215, the means 55 trigger a drive of the exhaust-gas recirculation valve 15 in such a manner that the exhaust-gas recirculation valve 15 is opened in order to prevent an excessive pressure buildup behind the electric compressor 10 to be subsequently activated and to adjust a constant, uniform and homogeneous air mass flow. Thereafter, there is likewise a branching to program point 220.

At program point 220, it can be provided as optional that the means 55 drive the throttle flap 25 in such a manner that the throttle flap is opened in order to avoid flow losses and to adjust the air mass flow more uniformly and to likewise avoid an excessive pressure buildup behind the electric compressor 10 which is to be subsequently activated. For the case that program point 220 was reached from program point 210, it can be additionally provided that the means 55 additionally drive the exhaust-gas recirculation valve 15 in order to open the same and, in this way, to more carefully avoid an excessive pressure buildup behind the electric compressor 10 which is to be subsequently activated and to adjust the air mass flow so that it is still more uniform. Thereafter, the means 55 drive the electric compressor 10 and control the same to a pregiven rpm in order to generate a constant, uniform and homogeneous air mass flow. Thereafter, the program branches to program point 225.

At program point 225, the means 55 check, based on the intake manifold pressure pS (which is determined by the first pressure sensor 45), whether a constant pressure has already adjusted behind the electric compressor 10. If this is the case, then the program branches to program point 230; otherwise, the program branches back to program point 225. The check as to a constant intake manifold pressure pS can take place in such a manner that the intake manifold pressure pS is detected as constant when it does not deviate from a fixed value by more than a pregiven fluctuation width. At program point 230, the means 55 determine the modeled air mass flow in the manner described. Thereafter, the program branches to program point 235.

At program point 235, the modeled air mass flow is supplied to the means 60 and, furthermore, the air mass flow, which is measured by the air-mass measuring device 1, is detected in the means 60. Thereafter, the program branches to program point 240.

At program point 240, the means 60 check whether the difference between the modeled air mass flow and the measured air mass flow is greater in magnitude than the pregiven value. If this is the case, the program branches to program point 245; otherwise, there is a movement out of the program. At program point 245, the means 60 generate a fault or warning announcement. If the monitoring of the air-mass measuring device 1 functions for calibrating the same, then, at program point 245, a corresponding matching of the air-mass measuring device 1 to the modeled air mass flow takes place for the rpm of the electric compressor 10 selected at program point 220. Thereafter, there is a movement out of the program. In the case of the described calibration of the air-mass measuring device 1, the program of FIG. 2 can be run through anew for different rpms of the electric compressor 10 which are to be adjusted at program point 220 so that the air-mass measuring device 1 is correspondingly matched for this rpm. With this calibration, the pregiven value defines the pregiven tolerance range as described.

The embodiment of FIG. 1 was described with respect to a single cylinder. When the engine 5 includes several cylinders, then it is sufficient for avoiding an excessive pressure buildup behind the electric compressor 10 if at least one cylinder (with a variable or full variable valve control) permits the simultaneous opening of its inlet valve and its outlet valve or, if at least one cylinder has a simultaneous opening of the inlet and outlet valves because of valve overlapment in its run-out position.

It is understood that the foregoing description is that of the preferred embodiments of the invention and that various changes and modifications may be made thereto without departing from the spirit and scope of the invention as defined in the appended claims.

What is claimed is:

1. A method for monitoring an air-mass measuring device in an air supply system of an internal combustion engine having an electrically-driven compressor, the method comprising the steps of:

modeling an air mass flow in said air supply system in dependence upon an rpm of said compressor and a pressure ratio of said compressor to obtain a modeled air mass flow; and, comparing said modeled air mass flow to a measured air mass flow measured by said air-mass measuring device.

2. The method of claim 1, comprising the further step of determining said rpm of said compressor and said pressure ratio of said compressor after switchoff of said engine.

3. The method of claim 2, comprising the further step of measuring said pressure ratio when a bypass to at least one cylinder of said engine is open.

4. The method of claim 3, wherein said bypass is an exhaust-gas recirculation valve.

5. The method of claim 1, comprising the further step of measuring said pressure ratio of said compressor when a throttle flap is open.

6. The method of claim 1, comprising the further step of measuring said pressure ratio of said compressor when an inlet valve and an outlet valve of at least one cylinder are simultaneously open.

7. The method of claim 6, comprising the further step of simultaneously opening said inlet valve and said outlet valve in dependence upon a piston position in at least one cylinder for measuring said pressure ratio of said compressor.

8. The method of claim 1, comprising the further step of utilizing a valve overlapment of an inlet valve and an outlet valve of at least one cylinder in dependence upon a run-out position of the piston for the measurement of said pressure ratio of said compressor.

9. The method of claim 1, comprising the further steps of:

providing a pressure sensor for determining a pressure in said air supply system downstream of said electrically-driven compressor; and, in advance of activating said electrically-driven compressor, matching said pressure sensor to an ambient pressure sensor.

10. The method of claim 1, comprising the further step of detecting a fault when a difference between said modeled air mass flow and said measured air mass flow exceeds a pregiven value in magnitude.

11. The method of claim 1, comprising the further step of matching said air-mass measuring device to said modeled air mass flow in dependence upon the comparison between said modeled air mass flow and said measured air mass flow.

12. The method of claim 11, wherein matching takes place when said comparison is outside a pregiven tolerance range.

13. An arrangement for monitoring an air-mass measuring device in an air supply system of an internal combustion engine having an electrically-driven compressor, the arrangement comprising:

means for modeling an air mass flow in said air supply system in dependence upon an rpm of said compressor and a pressure ratio of said compressor to obtain a modeled air mass flow; and, means for comparing said modeled air mass flow to a measured air mass flow measured by said air-mass measuring device.

* * * * *